(12) United States Patent
Meng

(10) Patent No.: US 9,061,592 B2
(45) Date of Patent: Jun. 23, 2015

(54) SYSTEM AND METHOD FOR DETECTING POWER INTEGRATOR MALFUNCTION

(75) Inventor: Ming Meng, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 276 days.

(21) Appl. No.: 13/357,255

(22) Filed: Jan. 24, 2012

(65) Prior Publication Data

US 2013/0190973 A1 Jul. 25, 2013

(51) Int. Cl.
*B60K 37/06* (2006.01)
(52) U.S. Cl.
CPC ........................................ *B60K 37/06* (2013.01)
(58) Field of Classification Search
USPC ............ 701/29.1, 29.6, 32.7, 33.7, 33.8, 33.9
See application file for complete search history.

(56) References Cited

U.S. PATENT DOCUMENTS

| | | | | |
|---|---|---|---|---|
| 4,055,772 | A * | 10/1977 | Leung ........................... | 307/10.1 |
| 5,337,013 | A * | 8/1994 | Langer et al. .................. | 324/537 |
| 5,638,246 | A | 6/1997 | Sakamoto et al. | |
| 5,895,989 | A | 4/1999 | Imaizumi et al. | |
| 6,339,302 | B1 * | 1/2002 | Greenbank et al. ........... | 318/103 |
| 6,469,404 | B1 | 10/2002 | Pohjola | |
| 6,668,219 | B2 * | 12/2003 | Hwang et al. ................. | 701/29.2 |
| 6,700,388 | B1 * | 3/2004 | Mayor et al. .................. | 324/537 |
| 7,135,788 | B2 * | 11/2006 | Metlitzky et al. ............. | 307/10.5 |
| 7,304,828 | B1 | 12/2007 | Shvartsman | |
| 7,345,383 | B2 | 3/2008 | Zushi et al. | |
| 7,349,772 | B2 * | 3/2008 | Delaney et al. ................... | 701/2 |
| 7,679,305 | B2 | 3/2010 | Eisenhardt | |
| 7,742,273 | B1 | 6/2010 | Shvartsman et al. | |
| 7,932,623 | B2 | 4/2011 | Burlak et al. | |
| 7,990,674 | B2 | 8/2011 | Kato et al. | |
| 8,000,846 | B2 * | 8/2011 | Dooley ............................. | 701/3 |
| 8,036,787 | B2 * | 10/2011 | Izumi et al. ................... | 701/33.7 |
| 8,234,035 | B2 * | 7/2012 | Iwagami et al. ............. | 701/30.5 |
| 8,322,689 | B2 * | 12/2012 | Johnson et al. ...... | 254/134.3 PA |
| 8,378,722 | B2 * | 2/2013 | Kanda ........................... | 327/156 |
| 8,392,050 | B2 * | 3/2013 | Arai et al. ..................... | 701/29.1 |
| 8,401,728 | B2 * | 3/2013 | Kubo et al. ................... | 701/29.1 |
| 2005/0043868 | A1 * | 2/2005 | Mitcham ......................... | 701/29 |
| 2005/0197747 | A1 * | 9/2005 | Rappaport et al. ................ | 701/1 |
| 2009/0080130 | A1 * | 3/2009 | Hein ............................... | 361/72 |

* cited by examiner

*Primary Examiner* — Nicholas Kiswanto
(74) *Attorney, Agent, or Firm* — Gifford, Krass, Sprinkle, Anderson & Citkowski, P.C.

(57) ABSTRACT

A system and a method for diagnosing and isolating a power integrator malfunction are herein provided. The system includes a controller for processing inputs from vehicle electronic control units (ECUs) to actuate semiconductor switching elements to further actuate vehicle electrical systems. The switching elements are in connection with the controller and actuated by a low current signal to actuate a high current circuit to drive an electrical load. Additional semiconductor devices are connected the switching devices for the purpose of monitoring overcurrent, overtemperature, and electromagnetic interference conditions that may affect the switching elements. A communications module is provided to send and receive communications relating to conditions affecting the switching elements over a communications bus. A display connected to the communications bus is operable to display conditions affecting the switching elements.

17 Claims, 6 Drawing Sheets

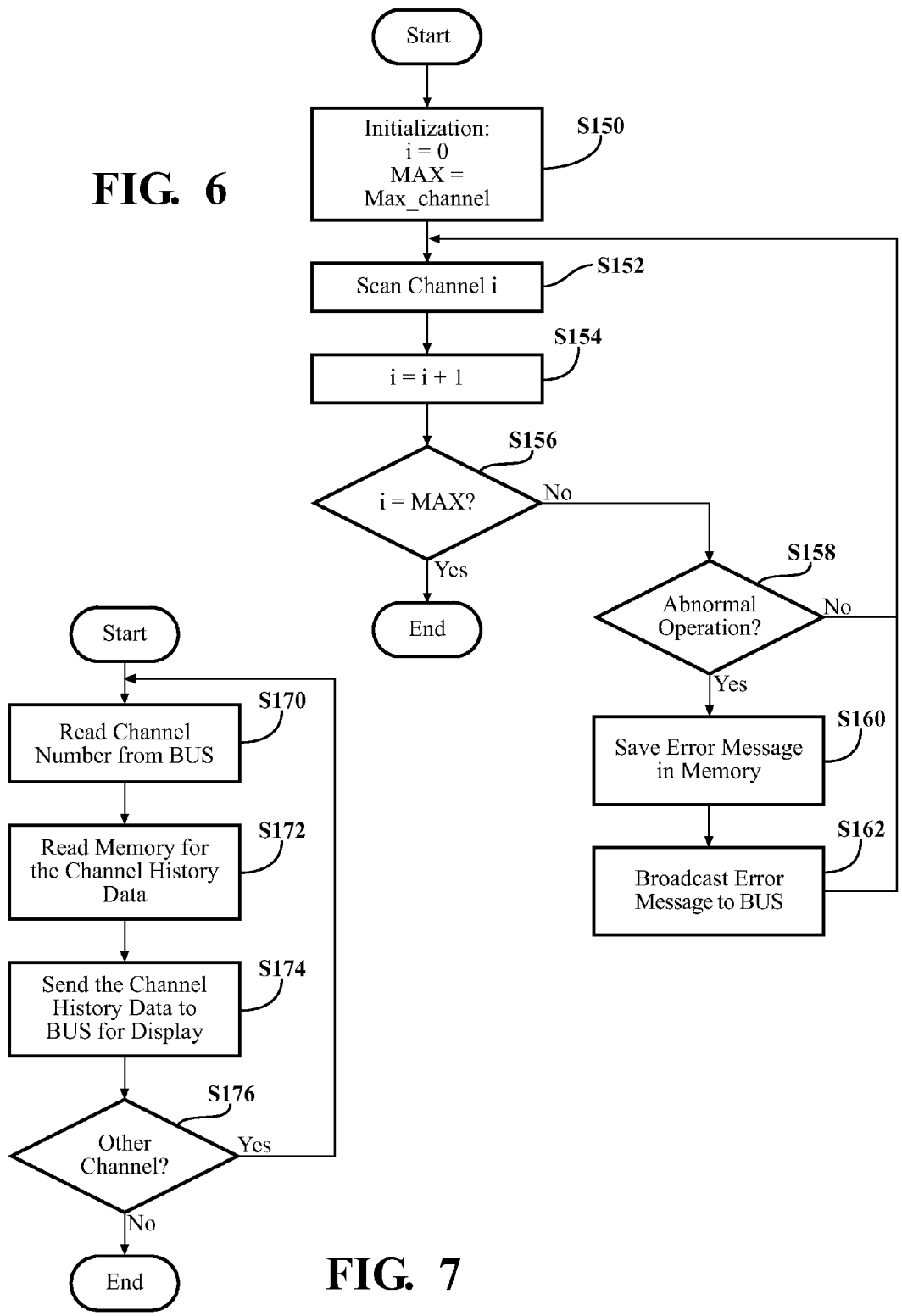

SYSTEM AND METHOD FOR DETECTING POWER INTEGRATOR MALFUNCTION

FIELD OF THE INVENTION

The present invention relates to a system and method for detecting a power integrator malfunction in a vehicle. More particularly, the invention relates to a system and method for monitoring and displaying the operational status of switching devices for vehicle electrical systems.

BACKGROUND OF THE INVENTION

Electromechanical switching devices such as relays and solid-state electronic switching devices such as power semiconductor devices are currently known and used in vehicle electrical systems. Switching devices such as relays and power semiconductors are regularly used for circuit isolation and protection, switching, and amplification in automotive applications.

Relays have traditionally been used in automotive applications due to their robustness and ability to handle higher currents than early solid-state devices. Relays are electromechanical devices and contain both mechanical and electrical elements. A relay operates by passing a current through a wire coil typically wound around an iron core to create a magnetic field. The magnetic field produced by the coil interacts with a magnetic armature to move the armature from one or more electrical contact positions to one or more different contact positions to either complete or break an electrical circuit depending on the relay design. A relay switching between two contacts operates in the same manner as a simple electrical switch. When current to the coil is switched off, the coil de-energizes and the magnetic field is eliminated. A spring under tension typically uses spring force to return the armature to its original position thereby completing or breaking the circuit depending on the relay design. However, a relay may be designed so that the force of gravity returns the armature to its original position.

Generally the current applied to the coil to produce the magnetic field which actuates the armature is much lower than the current flowing through the contacts when the armature completes the circuit.

Because relays contain moving parts, relays are prone to mechanical wear over their life. The mechanical wear may cause the relay to ultimately fail. Though simple in nature, relays are typically larger and more complex than semiconductor switches. Relay size, mechanical wear, cost and ease of manufacture play a significant role in vehicle electrical system design.

Solid-state switching devices (also called solid-state relays or SSRs) are semiconductors such as transistors and power semiconductor devices that provide a similar switching functionality of an electromechanical relay. In contrast to an electromechanical relay, SSRs contain no moving parts. The absence of moving parts increases a SSRs life and reliability.

In a simple SSR, a semiconductor device such as a transistor contains three or more terminals. An electric current applied to one pair of transistor terminals varies the current flowing through another pair of transistor terminals. Thus, a low current may be applied to a transistor to produce a high current flowing through another set of transistor terminals. In this way, a low current applied at the transistor input acts like an electrical switch to turn on a higher current at the transistor output.

Presently, SSRs can handle higher currents like electromechanical relays. SSRs are smaller and easier to manufacture than electromechanical relays. While SSRs may have a greater lifecycle and are more reliable than electromechanical relays, transient interference caused by sources of electromagnetic interference may falsely trigger an SSR to turn on.

Both semiconductor switching devices and electromechanical relays may malfunction or fail if subjected to electrical currents in excess of their rated current level (overcurrent) or their rated temperature level (overheating). Overcurrent conditions in a switching device may produce heat which in turn may also cause the switching device to overheat.

The proliferation of vehicle electrical systems continues to increase with technological advances in the automotive industry, consumer demand, and regulatory mandates. However, such an increase in vehicle electrical systems requires an increase in electrical components required to operate these systems. Thus, semiconductor switching devices are increasingly being used in automotive applications over electromechanical relays. While electromechanical relays are still widely used in automotive applications, their size, cost and ease of manufacture, compared with semiconductor switches, may be prohibitive in electrical system designs requiring many switching devices.

Currently, automotive switching devices are clustered together in one or more housings and may be segregated by switch type. Typically the housing may be named a relay box, junction box, junction block, power distribution center or power integrator depending on the switch type. The housing or housings are usually located in the vehicle engine compartment.

In instances where a semiconductor switching device fails, the test engineer or technician may be able to isolate the electrical system which has malfunctioned but not the switching device itself. To identify the switching device malfunction, a test engineer or technician must remove the semiconductor switch housing from the vehicle and isolate the malfunctioned switch with test equipment. With the increasing number of semiconductor switching devices used in vehicle electrical systems, the problem of semiconductor malfunction detection and isolation is becoming more burdensome, costly, and time consuming. Accordingly, it is desirable to have a cost-effective system and method for the real-time monitoring of the semiconductor switching devices that will quickly and easily diagnose semiconductor switching device malfunctions in a vehicle.

SUMMARY OF THE INVENTION

The present invention provides a system and method which overcomes the aforementioned disadvantages of diagnosing and isolating semiconductor switching device malfunctions.

A power integration module for diagnosing and isolating semiconductor switching device malfunctions and method thereof are provided. The power integration module has an assembly to both support and interconnect various electrical components which make up the system.

The power integration module has a controller mounted to the assembly for processing input signals from other vehicle electronic control units (ECUs) and sensors. Based on the inputs signals from the ECUs and sensors, the controller may actuate one or more semiconductor switching devices on the assembly to turn on, start, actuate or engage other vehicle electrical systems. The controller may also contain a memory device capable of storing which ECU and sensor signals are being input into the controller and the corresponding output signal from the controller to the semiconductor switching device. The memory may also store the functionality or nonfunctionality of the semiconductor switching devices actuated by controller output signals. Thus, the operational status of each semiconductor switching device may be monitored in real-time and stored in the controller memory.

A communications module is supported by the assembly and is electrically connected to the controller. The communications module may have both a communication controller and transceiver for processing, sending and receiving power integration system information and data received from the power integration controller to and from other vehicle ECUs equipped with similar communications modules via a vehicle communications bus. Accordingly, data and information may be transferred from the power integrator module to other vehicle systems, whereby the data and information may be processed by the other vehicle ECUs.

The power integrator module is communicatively connected via the vehicle communication bus to an output display whereby data and information from the power integrator system may be displayed on the display.

The power integrator module may also include an input sensor to detect transient interference from sources of electromagnetic interference which may interfere with the power integration module and cause the semiconductor switching devices to malfunction.

The power integrator module may also include one or more semiconductor devices on the assembly in electrical connection with the semiconductor switching devices. The one or more semiconductor devices connected with the semiconductor switching devices may be used for measuring current flow into, and thus the temperature of, the semiconductor switching devices. In turn, the electrical current and temperature data related to the semiconductor switching devices may be communicated to the power integrator controller for processing or storage.

The power integrator module optionally includes a protective housing which encases the assembly and the components mounted thereon. The protective housing may include a connection interface to connect the communications module within the protective housing to the vehicle communication bus system.

A method is provided for taking data and information relating to current flow through the semiconductor switching devices, transient interference affecting the semiconductor switching devices, temperature of the semiconductor switching devices and operational status of the semiconductor switching devices and displaying them in an easily understandable format on a vehicle display.

BRIEF DESCRIPTION OF THE DRAWINGS

FIG. 6 is a schematic flowchart of the method for detecting switching device malfunctions within the power integrator module; and FIG. 7 is a schematic flowchart of the method for displaying operational status of the switching devices within the power integrator module on the vehicle display.

DETAILED DESCRIPTION OF THE INVENTION

The present invention has utility as a power integrator module for use in a vehicle that overcomes the aforementioned disadvantages. The power integrator system and method provides a vehicle operator, technician, or test engineer with a quick and easy way to diagnose and isolate switching device malfunctions in a vehicle. Additionally, concerns of transient interference from electromagnetic sources, overheating, and overcurrent conditions affecting vehicle switching devices may be more easily understood which in turn will lead to better vehicle electrical system design. The time, labor, test equipment and expense avoided with the diagnosing and isolating of switching device malfunctions will lead to faster design and product testing and provide vehicle manufacturers with the ability to more quickly release new vehicles in the marketplace.

Figure 1:
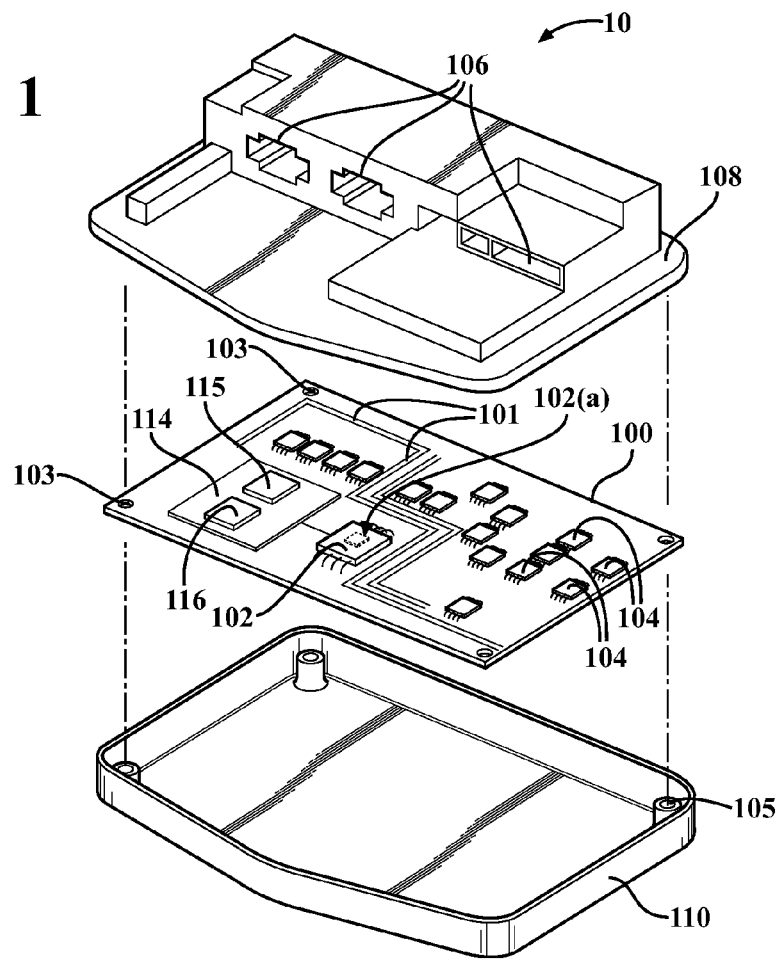
FIG. 1 is a view of the power integrator module with protective outer casing.

Referring to FIG. 1, the power integrator module for diagnosing and isolating switching device malfunctions in a vehicle is generally indicated at 10. The power integrator module 10 includes an assembly 100 with electrical components mounted thereon. Preferably, assembly 100 is a printed circuit board (PCB), but may be any other means of packaging and electrically connecting electronic components known in the art including, but not limited to: point-to-point connection, wire wrapping, breadboards, stripboards, multi-chip modules, or any other electronics packaging known in the art. Electrical components mounted to assembly 100 are electrically interconnected via conductive traces 101.

Power integrator module 10 further includes controller 102 mounted on assembly 100. Controller 102 is preferably a stand alone microcontroller (MCU) for use in embedded systems, but may be a microprocessor or the like. Controller 102 is an integrated circuit (IC or chip) that accepts instructions, digital data and the like on a carrier wave or signal from other vehicle controllers, systems, and sensors as input, processes the input according to instructions stored on a memory 102a of controller 102 or another memory, and provides an output. The controller memory 102a is preferably of the non-volatile type and may be read-only (ROM), flash, EEPROM and the like. Output from controller 102 is conveyed by signal, carrier wave or electrical charge via conductive pathways 101 to actuate one or more semiconductor switching devices 104.

Switching devices 104 may be any semiconductor switching devices known and used in the industry. Preferably, switching device 104 is a solid-state semiconductor device packaged as a chip or IC for mounting on assembly 100. However, switching device 104 need not be limited to this design and may be any electrical switching device known and commonly used in the industry. Switching device 104 may be actuated by a low current signal from controller 102 to actuate and output a higher current flow within switching device 104 to be output to other vehicle systems.

Power integrator module may include protective packaging 108 and 110 which may encase and prevent damage to assembly 100 and electrical components 102 and 104. Bottom half 110 of the protective casing may include means to stabilize and support assembly 100, such as recess 105 which allows attachment hardware such as a screw or the like to interconnect bottom half 110 with hole 103 of assembly 100 and attach to a corresponding recess (not shown) on top half 108 to form a robust protective packaging and support for assembly 100. Top half 108 may include connection interfaces 106 to allow electrical connections between assembly 100 and electrical components thereon to electrically interact with other vehicle systems.

Figure 3:
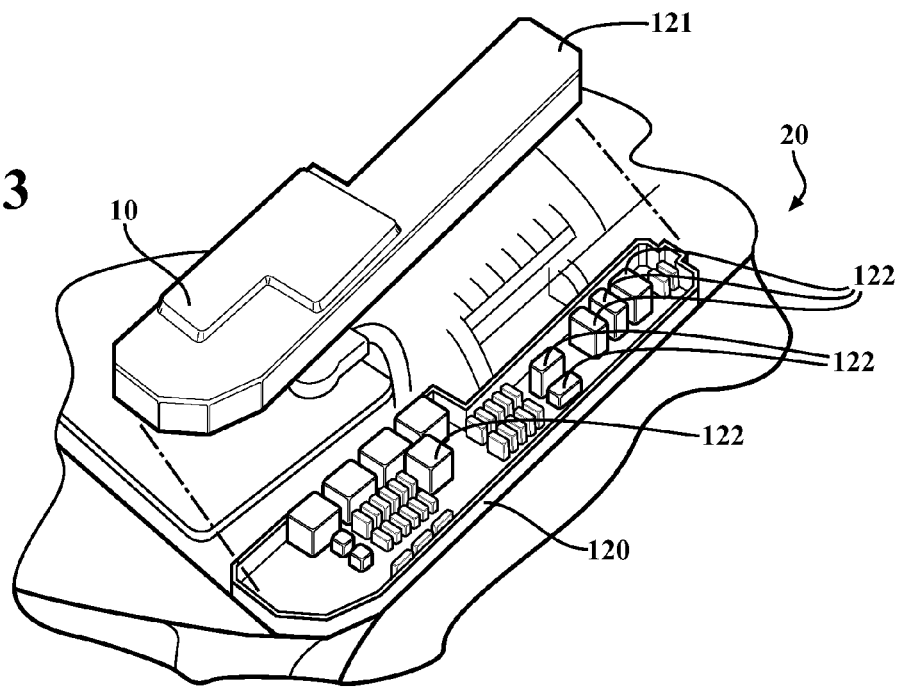
FIG. 3 is a view showing a mounting location of the power integrator module within the vehicle along with traditional electromechanical switching elements.

Referring now to FIG. 3, electrical and electromechanical switching means and their respective packagings are generally shown at 20. Power integrator module 10 is shown as being fixedly attached to protective casing 121 of relay box 120 housing electromechanical relays 122. While relay box 120 and power integrator 10 are preferably mounted to each other or in close proximity to one another in the engine compartment of the vehicle, they are not limited to these mounting positions or locations.

Referring now to FIGS. 2A-2D, a vehicle multimedia device is generally shown at 30. Multimedia display may include display screen 130 for displaying graphics, texts, and animations thereon. Display screen 130 is preferably a flat screen thin film transistor liquid crystal display (TFT-LCD) or the like commonly used in industry, but may be cathode ray tube (CRT), electroluminescent (ELD), light emitting diode (LED), plasma panel (PDP), digital light processing (DLP) or other displays commonly known in the art.

Display screen 130 may be of the touch screen type or may be controlled by buttons, switches, and knobs shown collectively at 136 or may be controlled by other means such as remote control or voice command. While diagnostic mode 132 relating to the operational status or malfunction of switching devices 104 of the power integrator module 10 may be regularly shown to a vehicle operator by actuating a button or sequence of buttons 136 on vehicle display 130, diagnostic mode 132 need not be readily available to a normal vehicle operator and may be reserved for test engineers and technicians. Test engineers or technicians may be able to access diagnostic mode 132 on display 130 by entering a secret sequence of button presses, combination of button presses, or the like.

Diagnostic mode 132 may include a display of one or more different channels 134. Each channel 134 corresponds to a corresponding switching device 104 of power integrator module 10.

Figure 2A:
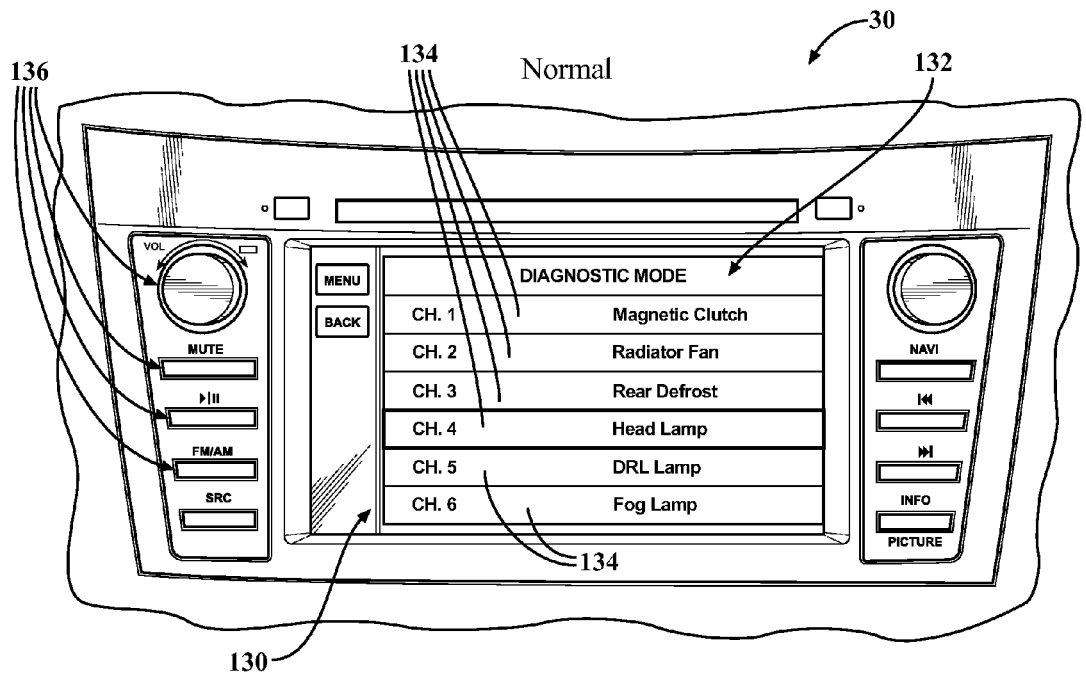
FIGS. 2A-2D are a view of the diagnostic mode on the vehicle display.
Figure 2B:
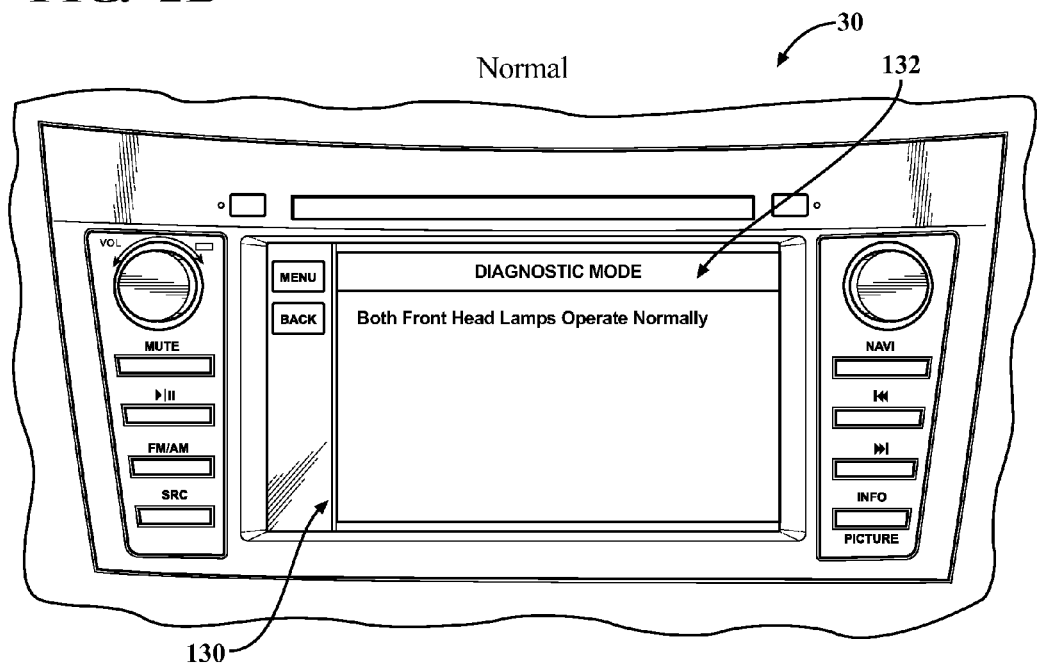

FIGS. 2A and 2B show different embodiments of diagnostic mode 132 during normal switching device 104 operating conditions. While channels 134 illustrate exemplary vehicle systems actuated by switching devices 104, they are in no way limited to these vehicle systems. By selecting channel 4 (CH. 4) in FIG. 2A, an operator, technician or test engineer may obtain further information about the vehicle headlight system associated with CH. 4. FIG. 2B shows more information related to CH. 4 in diagnostic mode 132 and shows that the vehicle system associated with switching device 104 represented by channel 134 of display 130 is operating properly.

Figure 2C:
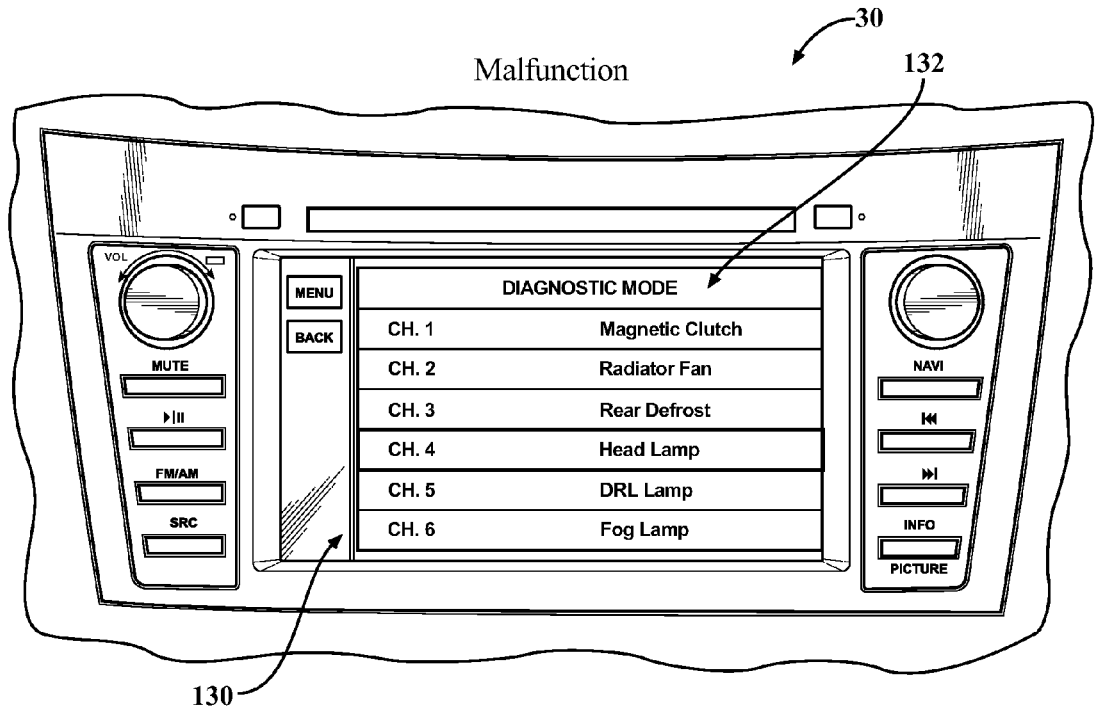
Figure 2D:
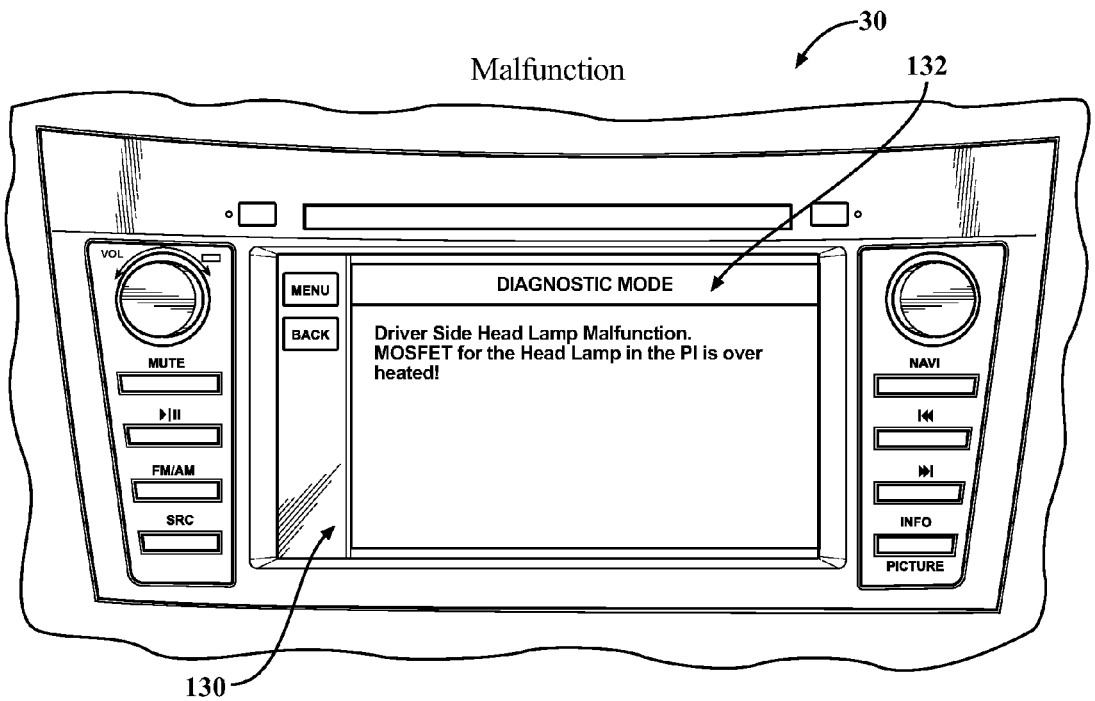

FIGS. 2C and 2D show embodiments of diagnostic mode 132 in which a switching device 104 malfunction leads to a vehicle system malfunction. Similar to the embodiments described in FIGS. 2A and 2B, a vehicle operator, test engineer or technician may select a channel 134 which represents a vehicle electrical system actuated by the associated switching device 104 in power integrator module 10. FIG. 2D illustrates a malfunction in CH. 4 and shows that a system malfunction is due to the overheating and malfunction of switching device 104 associated with this vehicle system.

All vehicle electrical systems controlled by switching devices 104 may be displayed in diagnostic mode 132 on display 130. In this way a user of diagnostic mode 132 may easily and quickly troubleshoot vehicle electrical system malfunctions caused by the malfunctioning of the switching devices 104 associated therewith, in a convenient, organized, menu-driven application.

Figure 4:
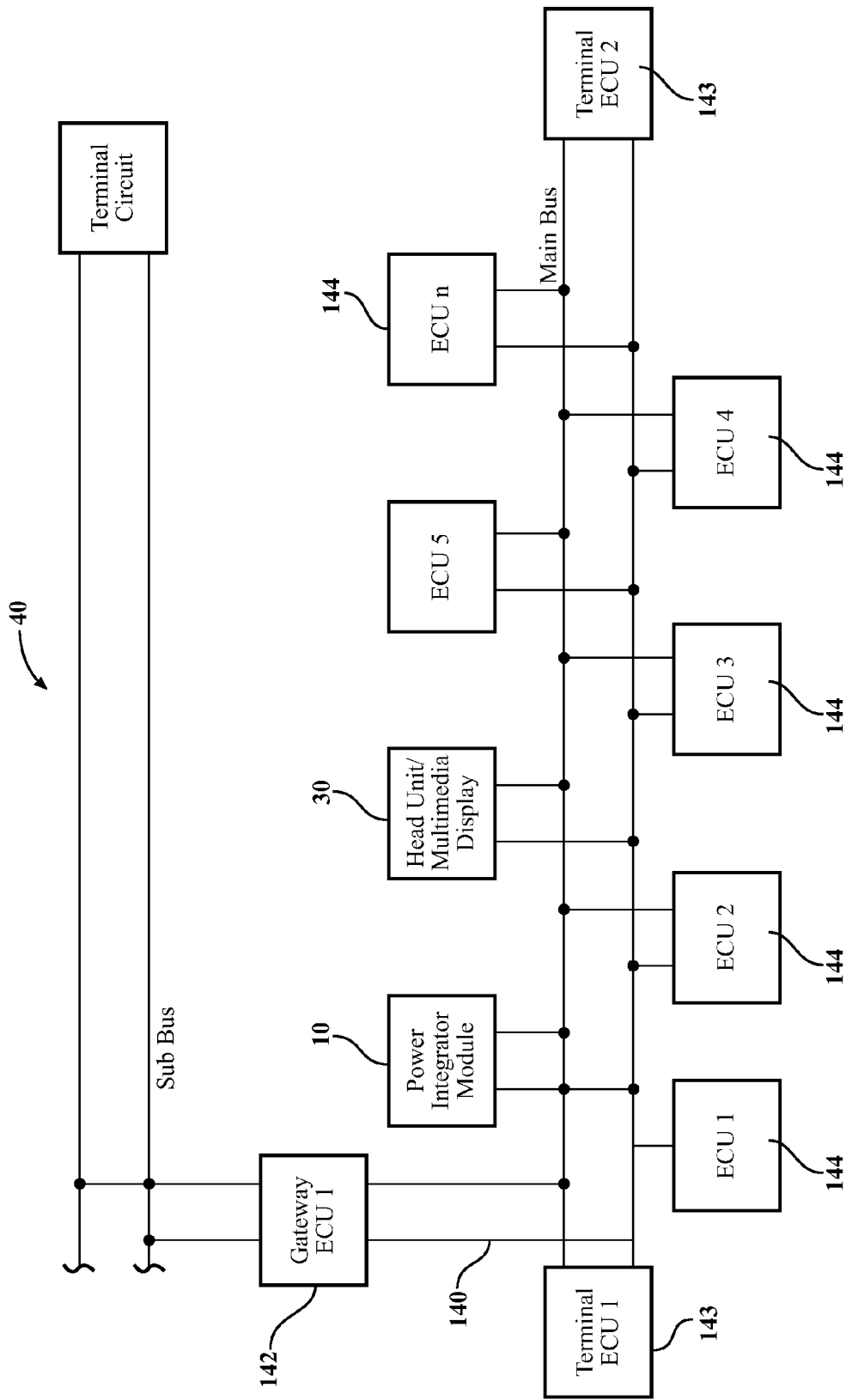
FIG. 4 is a general schematic of the vehicle communication bus system.

Referring now to FIG. 4, a vehicle node-based communication bus system is generally shown at 40. In this embodiment, three communications busses are shown as indicated by the main bus, sub-bus, and the interconnection bus therebetween. Electrical/electronic control units (ECUs) associated with one or more vehicle embedded are independent controllers that control one or more vehicle electrical systems or subsystems. Many vehicles may contain upwards of 80 or more ECUs as illustrated by ECU n on the main communication bus. Power integrator module 10 and multimedia display 30 are both controlled by ECUs and connected to the vehicle communications bus. Controller 102 serves at the ECU for power integrator module 10. Vehicle ECUs 102, 142, 143, and 144 and the ECU associated with multimedia unit 30 may be arranged in a hierarchical manner which control how various ECUs may communicate with one another over various communication busses. Communication bus 40 allows controller 102 of power integrator module 10 to communicate information to and display information on multimedia display 130.

Preferably, vehicle communication bus 40 is a Controller Area Network (CAN)-bus system commonly known in the art. CAN-bus is a vehicle communication bus standard and allows the ECUs of vehicle systems to communicate with one another without the need of a host computer. However, other vehicle bus standards may be used, including but not limited to: Vehicle Area Network (VAN), FlexRay, Local Interconnect Network (LIN), J1939 and ISO 11783, Media Oriented Systems Transport (MOST), Train Communication Network IEC 61375 and sub-protocols associated therewith, Domestic Digital Bus (DB2), Keyword Protocol 2000 (KWP2000), DC-BUS, IDB-1394, SMARTwireX, J1850, ISO-9141-I/-II, J1708 and J1587, SPI, IIC and the like. Computer networking technologies such as Ethernet and TCP/IP and the like may also be used.

The communication bus 40 may be arranged such that ECUs 102, 142, 143, 144 and the ECU associated with multimedia unit 30 may be interconnected via a hardwired connection 140 or may be wirelessly interconnected using wireless technologies and protocols commonly known in the art.

Figure 5:
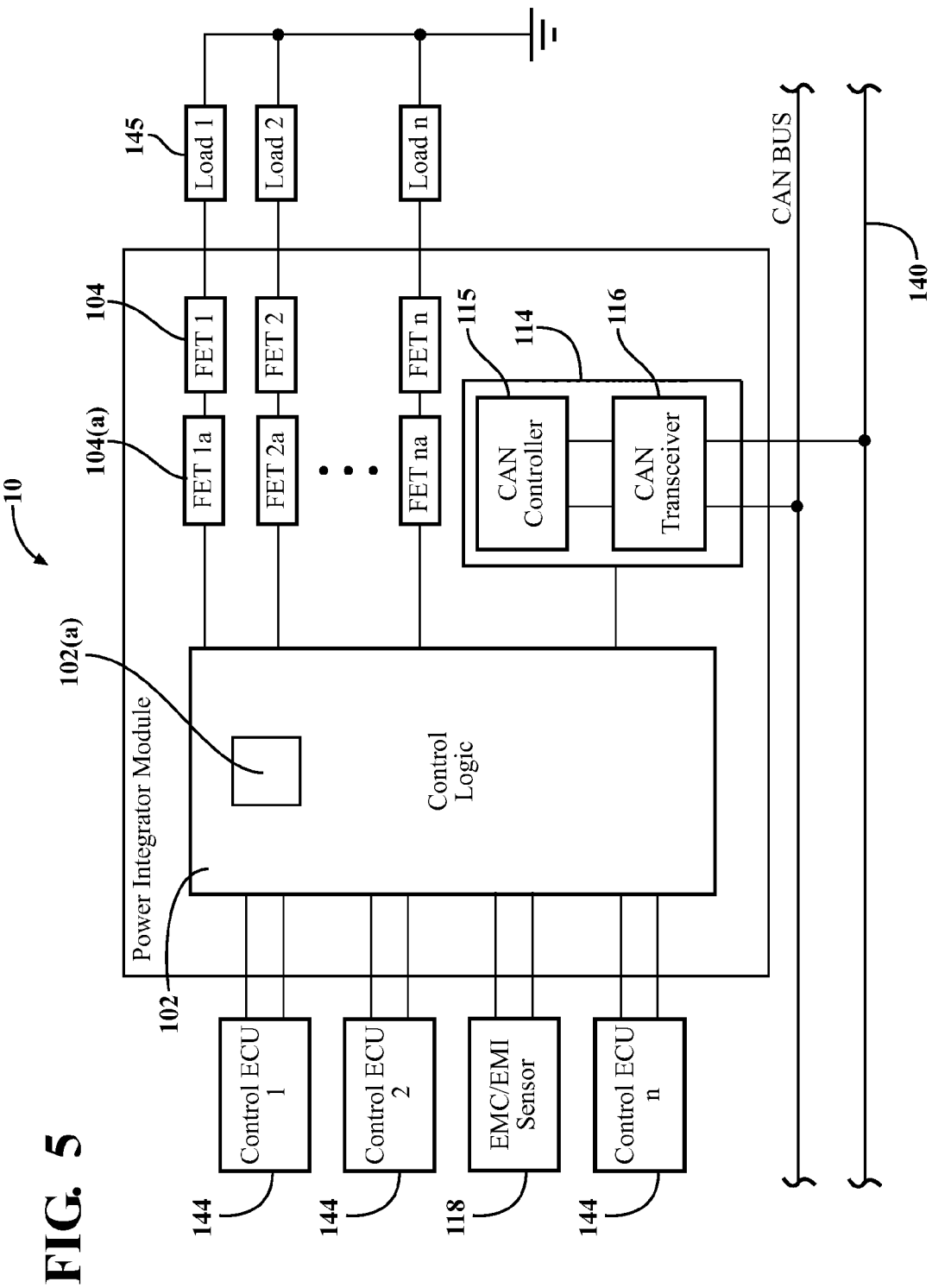
FIG. 5 is a schematic of the power integrator module and the interconnection between vehicle system inputs, load outputs, and connection to the vehicle communication bus.

Referring now to FIG. 5, a schematic view of the power integrator module 10 and its interrelation to input and output sources is shown. Vehicle ECUs 144 and sensors may provide inputs 144 to power integrator module 10 to actuate various vehicle electrical systems output (loads) 145 via switching devices 104.

Sensor inputs may include data and signals related to the measurement of transient interference sources from electromagnetic sources measured by EMI/EMC sensor 118. Electromagnetic interference (EMI) is a disturbance or noise that affects electrical circuits by electromagnetic induction or electromagnetic radiation emitted from external sources or sources within the circuit. EMI may negatively affect the operations of electrical devices on a circuit. As stated, EMI may trigger certain switching devices 104 to trigger unexpectedly. Prudent designers of electrical systems analyze and design circuits to shield them from, prevent and mitigate the effects of EMI, however, often times there are sources of EMI that are not contemplated in the design of electrical systems. Vehicle ignition systems and the emissions from high tension power lines, for example but not limited to, are sources of EMI which designers readily recognize and the effects of EMI on a circuit can be diminished or eliminated because such sources are so well known. However, unexpected sources of EMI such as, but not limited to, a solar flare or aurora may cause a circuit malfunction including the unexpected triggering (in-rush current) of a switching device 104.

Designing to prevent all EMI is impractical from a design perspective. To do such would add unnecessary higher costs to a vehicle. EMI is almost omnipresent and is measured at different levels. Electrical components are often designed to withstand certain levels of EMI, but unexpected sources may provide EMI levels in excess of a threshold level. Sensor 118 is a cost-effective solution for detecting unexpected EMI over a threshold level. Most vehicles are rigorously tested to ensure that they are compatible with electromagnetic interference sources, but unexpected high levels of EMI still exist. Sensor 118 ensures that a malfunction of switching device 104 is not caused by EMI.

Within power integrator module 10, the switching devices 104 shown here as, but not limited to, Field Effect Transistors (FETs, e.g. Power MOSFETs and the like) may be connected to another FET 104(a). FETs 104(a) do not necessarily actuate loads associated with FETs 104, but may be used to monitor the amount of current flowing to and thus the temperature of FET 104 by utilizing Joule's law. Joule's law can express heat produced by flowing through a conductor and is expressed as:

$$Q = I^2 \cdot R \cdot t \qquad \text{(Equation 1)}$$

where Q is the heat produced by constant current I flowing through conductor with electrical resistance R over a time period t. While using Joule's law and FET 104(a) to measure temperature and current flowing to switching device 104, and thus detect malfunctions caused by overheating and overcurrent, this is but an exemplary and cost-effective embodiment. FET 104(a) may be replaced by a current sensing device or temperature sensor to monitor current flow through and temperature of switching device 104.

In the preferred embodiment using a CAN-bus for vehicle communications, CAN communication module 114 must be attached to a vehicle system to provide CAN communication functionality. CAN communication module 114 provides communication to and from power integrator controller 102 to other vehicle systems via the CAN-bus. Communications module 114 may include a CAN controller 115 for providing communications to and from power integrator controller 102 and sending or receiving communication to and from the CAN transceiver 116 and ultimately to and from other vehicle systems.

Switching device malfunction may be reported in real-time for display in diagnostic mode 132 on display 130 or they may be stored into non-volatile memory 102a of controller 102 as error messages to provide a historical log of switching device 104 malfunctions in diagnostic mode 132 or display. While real-time and historical reporting are both the preferred embodiments of malfunction reporting, they need not be stored necessarily to non-volatile memory 102a and may be reported or stored using known algorithms or processes common to the art.

Referring now to FIG. 6, a flowchart for showing the method of detecting a malfunction of a switching device is provided. The method runs in real-time from a program stored on non-volatile memory 102a. In one embodiment, at S150 the program initializes by identifying all the channels controlled by switching devices 104. The program next initializes at S152 to prepare scanning each channel controlling a switching device. Next the program increments at S154 and determines at S156 if the maximum number of channels have been scanned. If the program determines the maximum number of channels have not been scanned, the program advances to S158 to determine if there is an abnormal operation at the channel currently being scanned. If the channel is operating properly, the program returns to S152 to begin scanning the next channel. However, if it is determined that the switching device of the scanned channel is not working properly, the malfunction error will be saved to a memory 102a at S160. The error is then broadcast over the communications bus to other vehicle systems at S162 and the program returns to S152 to begin scanning the next channel. While this is a specific method of accomplishing malfunction detection, it is but an exemplary embodiment and other algorithms or methods may be used to accomplish the spirit and scope of what is described in this exemplary embodiment. In this exemplary embodiment, the method provides only a process by which malfunction data can be stored onto memory 102a and communicated via communication bus 40, however simple manipulation of the algorithm and process could also show a method for showing the operational status (both normal operations and malfunctions or any combination thereof) on one or more specific channels either in real-time, using historical data stored to memory 102a, or any combination or manipulation thereof.

Referring now to FIG. 7, a flowchart for showing the method of displaying an error message caused by a switching device 104 malfunction on display 130 is provided. One or more channels associated with a switching device 104 malfunction is requested from the diagnostic mode 132 on display 130 at S170. The requested channel is read from memory 102a and is broadcast from the communications controller 114 to other vehicle communications controllers at S172, and in one embodiment, broadcast to the communications controller of media device 30 to be displayed on 130 at S174. If the operator requests the malfunction history of another channel at S176, the channel returns to S170 to repeat the process, and if not the program ends. While this is a specific method of accomplishing malfunction detection, it is but an exemplary embodiment and other algorithms or methods may be used to accomplish the spirit and scope of what is described in this exemplary embodiment. In this exemplary embodiment, the method provides only a process by which malfunction data for one or more switching devices 104 stored on memory 102a may be requested by media unit 30 and displayed in diagnostic mode 132 of display 130. However, simple manipulation of the algorithm and process could also show a method for showing the operational status (both normal operations and malfunctions or any combination thereof) on one or more specific channels either in real-time, using historical data stored to memory 102a, or any combination or manipulation thereof.

Although a presentation of the preferred embodiment(s) has been described, it is for illustrative purposes only. It is therefore to be understood that the terminology used is intended to be in the nature of words of description rather than of limitation. Many modifications and variations of the embodiments described herein are possible in light of the aforementioned teachings and descriptions.

I claim:

1. A vehicle power integration system comprising:
   a power integration controller selected from the group consisting of a stand alone microcontroller or a microprocessor, the power integration controller processing one or more input signals from one or more vehicle electronic control units to the power integration system to produce one or more output signals in accordance with the one or more input signals and for monitoring in real-time an operational status of one or more switching elements and storing the operational status on a memory;
   one or more switching elements operatively connected to the power integration controller and actuated by the one or more output signals from the power integration controller for actuating one or more loads of a vehicle electrical system;

a communication module operatively connected to the power integration controller for operatively communicating the operational status of the one or more switching elements over a vehicle communications bus system; and a multimedia display device operatively connected to the vehicle communications bus system, the power integration controller in combination with the multimedia display device operable to selectively display a textual or a graphical representation of the operational status of the one or more switching elements in a real time diagnostic mode and a historic diagnostic mode.

2. The vehicle power integration system of claim 1 further comprising a protective casing, the protective casing having an upper part and a lower part whereby the upper part and the lower part interconnect to encase the power integration controller, the one or more switching elements and communication module, and the protective casing provides one or more connection interfaces for operatively connecting the communication module to the vehicle communications bus system.

3. The vehicle power integration system of claim 1, wherein the one or more output signals from the power integrator controller is a low current signal and the low current signal actuates the one or more switching elements to actuate the one or more loads of a vehicle electrical system, whereby a circuit of the one or more loads of a vehicle electrical system is driven by a current greater than the low current signal.

4. The vehicle power integration system of claim 1, wherein the one or more input signals are from a sensor for detecting a predetermined level of electromagnetic interference and the predetermined level of electromagnetic interference is stored on the memory as the operational status of the one or more switching elements.

5. The vehicle power integration system of claim 1 wherein the communication module comprises a controller and a transceiver.

6. The vehicle power integration system of claim 5, wherein the controller is a CAN controller, the transceiver is a CAN transceiver, and the vehicle communications bus is a CAN-bus.

7. The vehicle power integration system of claim 1, wherein the one or more switching elements are interconnected to at least one other semiconductor device, the at least one other semiconductor device operable to measure overcurrent and overtemperature conditions in the one or more switching elements and the at least one other semiconductor device provides the power integration controller overcurrent and overtemperature condition data, wherein the overcurrent condition data and the overtemperature condition data are stored on the memory as the operational status of the one or more switching elements.

8. The vehicle power integration system of claim 1, wherein the one or more switching elements are solid-state electronic switching elements.

9. The vehicle power integration system of claim 1, wherein selective actuation of buttons on the multimedia display device displays the real time diagnostic mode and the historic diagnostic mode.

10. A vehicle power integration system comprising:
a power integration controller selected from the group consisting of a stand alone microcontroller or a microprocessor, the power integration controller processing one or more input signals from one or more vehicle electrical control units to produce one or more low current output signals in accordance to the one or more input signals;

one or more solid-state electronic switching elements electrically connected to the power integration controller via a conductive pathway and actuated by the one or more low current output signals to actuate one or more high current circuits driving one or more electrical loads;

one or more semiconductor devices connected to the power integration controller, the one or more semiconductor devices to detect overcurrent and overtemperature conditions in the one or more solid-state electronic switching elements and provide overcurrent and overtemperature condition data to the power integration controller;

an electromagnetic interference sensor operably connected to the power integrator controller for sensing a predetermined amount of electromagnetic interference;

a memory device in connection with the power integrator controller for storing the overcurrent data, the overtemperature data and the predetermined amount of electromagnetic interference as one or more error messages;

a CAN-bus communications module electrically connected to the power integrator controller for electrically communicating the one or more error messages over a vehicle CAN-bus; and a vehicle multimedia display device electrically connected to the vehicle CAN-bus to display the one or more error messages in a real time diagnostic mode and a historic diagnostic mode.

11. The vehicle power integration system of claim 10 further comprising a protective casing housing the power integration controller, the one or more solid-state electronic switching elements, the one or more semiconductor devices and the CAN-bus communications module.

12. The vehicle power integration system of claim 10 further comprising the vehicle multimedia display device capable of entering the real time diagnostic mode and the historic diagnostic mode for the one or more solid-state electronic switching elements when selected buttons are actuated on the vehicle multimedia display device.

13. A method for integrating vehicle power systems comprising the steps of:
providing input signals from one or more vehicle electronic control units or sensors to a power integration controller selected from the group consisting of a stand alone microcontroller or a microprocessor, the power integration controller;

processing input signals from one or more vehicle electronic control units through the power integration controller to provide output signals;

actuating one or more switching elements based on the output signals from the power integration controller;

monitoring the one or more switching elements for overcurrent and overtemperature conditions;

monitoring an electromagnetic interference sensor for a predetermined amount of electromagnetic interference;

saving one or more error message into memory when an overcurrent condition or overtemperature condition is detected in the one or more switching elements or when the predetermine amount of electromagnetic interference is detected by the electromagnetic interference sensor;

broadcasting the one or more error messages saved into memory over a vehicle communications bus to a vehicle multimedia display device; and displaying the one or more error messages for the one or more switching elements on the vehicle multimedia display device in a real time diagnostic mode and a historical diagnostic mode.

14. The vehicle power integration system of claim 1, wherein the textual or graphical representation of the operational status of the one or more switching elements is displayed in a plurality of selectable menus.

15. The vehicle power integration system of claim 14, wherein the plurality of selectable menus are navigable using selective actuation of buttons on the multimedia display device.

16. The vehicle power integration system of claim 10, wherein the error messages are displayed in a plurality of selectable menus.

17. The vehicle power integration system of claim 16, wherein the plurality of selectable menus are navigable using selective actuation of buttons on the vehicle multimedia display device.

* * * * *